(12) United States Patent
Hosokawa

(10) Patent No.: US 11,953,754 B2
(45) Date of Patent: Apr. 9, 2024

(54) LENS DRIVE DEVICE

(71) Applicant: TDK CORPORATION, Tokyo (JP)

(72) Inventor: Masahiro Hosokawa, Tokyo (JP)

(73) Assignee: TDK CORPORATION, Tokyo (JP)

(*) Notice: Subject to any disclaimer, the term of this patent is extended or adjusted under 35 U.S.C. 154(b) by 672 days.

(21) Appl. No.: 17/253,772

(22) PCT Filed: Jun. 17, 2019

(86) PCT No.: PCT/JP2019/023956
§ 371 (c)(1),
(2) Date: Dec. 18, 2020

(87) PCT Pub. No.: WO2019/244852
PCT Pub. Date: Dec. 26, 2019

(65) Prior Publication Data
US 2021/0255417 A1    Aug. 19, 2021

(30) Foreign Application Priority Data

Jun. 21, 2018 (JP) ................................. 2018-117723
Jul. 20, 2018 (JP) ................................. 2018-136907

(51) Int. Cl.
*G02B 7/09* (2021.01)
*G02B 7/02* (2021.01)
(Continued)

(52) U.S. Cl.
CPC ............... *G02B 7/09* (2013.01); *G02B 7/023* (2013.01); *H02N 2/006* (2013.01); *H02N 2/04* (2013.01);
(Continued)

(58) Field of Classification Search
CPC ........ G02B 27/646; G02B 7/02; G02B 7/023; G02B 7/026; G02B 7/04; G02B 7/09; G03B 3/10; G03B 30/00; G03B 2205/0053; G03B 2205/0061; H02N 2/001; H02N 2/0015; H02N 2/005; H02N 2/0055; H02N 2/006; H02N 2/0075; H02N 2/02; H02N 2/04;
(Continued)

(56) References Cited

U.S. PATENT DOCUMENTS

| | | | | |
|---|---|---|---|---|
| 10,429,606 | B2 * | 10/2019 | Maruyama | ............... G02B 7/08 |
| 2012/0218651 | A1 * | 8/2012 | Onishi | ................... H02N 2/025 |
| | | | | 310/323.02 |

FOREIGN PATENT DOCUMENTS

| | | | |
|---|---|---|---|
| JP | 6024798 | B1 * | 11/2016 |
| JP | 6024798 | B1 | 11/2016 |

OTHER PUBLICATIONS

Sep. 10, 2019 Search Report issued in International Patent Application No. PCT/JP2019/023956.
(Continued)

*Primary Examiner* — Emily P Pham
(74) *Attorney, Agent, or Firm* — Oliff PLC

(57) ABSTRACT

A lens drive device including, a variation in a distance between the support point and an action point of the leaf spring member is suppressed, and a variation in a biasing force of the leaf spring member determined according to the distance between the support point and the action point is also suppressed. As a result, a frictional force of the frictional engagement between a friction engagement member and an actuator is uniform, and driving characteristics of the lens drive device are uniform.

5 Claims, 16 Drawing Sheets

(51) Int. Cl.
*H02N 2/00* (2006.01)
*H02N 2/04* (2006.01)
*G03B 3/10* (2021.01)

(52) U.S. Cl.
CPC ........ *G03B 3/10* (2013.01); *G03B 2205/0061* (2013.01)

(58) Field of Classification Search
CPC ...... F16F 1/02; F16F 1/027; F16F 1/18; F16F 1/368
See application file for complete search history.

(56) References Cited

OTHER PUBLICATIONS

Dec. 22, 2020 International Preliminary Report on Patentability issued in International Patent Application No. PCT/JP2019/023956.

* cited by examiner

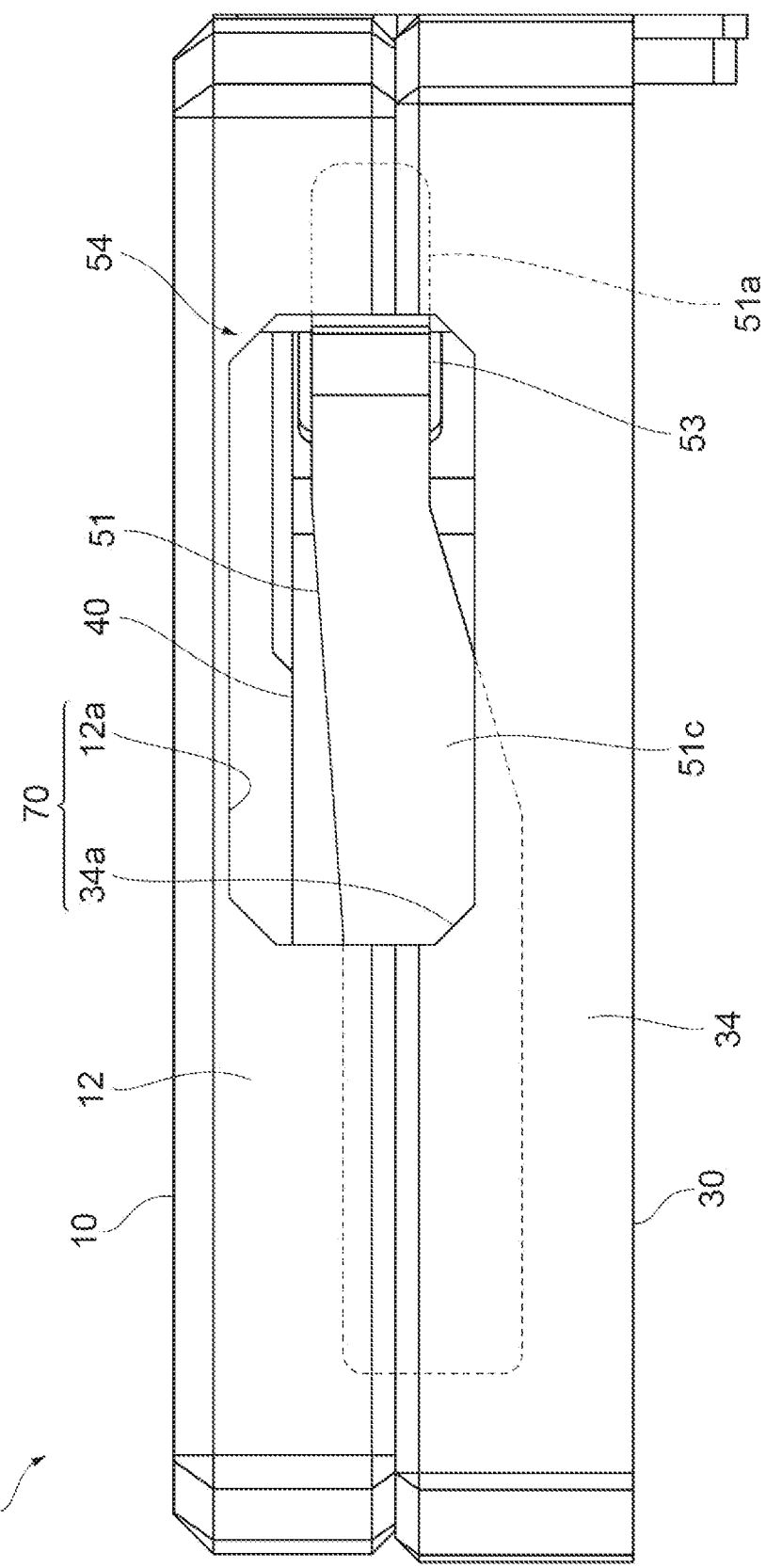

LENS DRIVE DEVICE

CROSS-REFERENCE TO RELATED APPLICATIONS

This application is a 35 U.S.C. § 371 national phase application of PCT/JP2019/023956, filed on Jun. 17, 2019, which claims priority to Japanese Patent Application No. 2018-117723, filed on Jun. 21, 2018 and Japanese Patent Application No. 2018-136907, filed on Jul. 20, 2018.

DESCRIPTION

Technical Field

The present disclosure relates to a lens drive device.

Background Art

As a lens drive device used in an imaging apparatus mounted in a mobile phone or the like, Patent Literature 1 below discloses a lens drive device that moves a lens frame to which a lens is fitted by a piezoelectric actuator in an optical axis direction. In the lens drive device of Patent Literature 1, a leaf spring member disposed along an outer periphery of the lens frame biases the piezoelectric actuator disposed on the outer periphery of the lens frame toward the lens frame, and thus, the lens frame frictionally engages the piezoelectric actuator.

CITATION LIST

Patent Literature

Patent Literature 1: Japanese Patent No. 6024798

SUMMARY OF INVENTION

Technical Problem

In the aforementioned lens drive device, since a biasing force of the leaf spring member affects a frictional force between the lens frame and the piezoelectric actuator, when the biasing force of the leaf spring member differs for each product, the difference in the biasing force causes a variation in drive characteristics of the lens drive device.

Through diligent studies, the inventors have newly found a technology capable of achieving uniform driving characteristics by suppressing the variation in the biasing force of the leaf spring member.

The present disclosure provides a lens drive device in which driving characteristics are uniform.

Solution to Problem

A lens drive device according to an aspect of the present disclosure includes a base member, a lens frame positioned on an upper side of the base member, a lens is attached to the lens frame, an actuator extending along an optical axis direction of the lens at an outer periphery of the lens frame, and being capable of extending and contracting in the optical axis direction of the lens, one end portion of the actuator in the optical axis direction being fixed to the base member, a leaf spring member extending along the outer periphery of the lens frame, and including a first end portion and a second end portion, the first end portion frictionally engaging an outer periphery of the other end portion of the actuator in the optical axis direction such that the other end portion is biased toward the lens frame, and the second end portion gripped by the lens frame on a first surface close to an optical axis of the second end portion and a second surface opposite to the first surface, and a support point portion positioned closer to the first end portion than a fixed portion, the second end portion of the leaf spring member and the lens frame are fixed at the fixed portion, the second surface of the second end portion and the lens frame contact each other at the support point portion as a support point of the leaf spring member.

The lens drive device includes the support point portion in which the second surface of the second end portion and the lens frame are in contact with each other, and this support point portion is a support point of the leaf spring member. Accordingly, a variation in a biasing force of the leaf spring member is suppressed, and driving characteristics can be uniform.

In the lens drive device according to another aspect of the present disclosure, the support point portion is a protrusion protruding from the lens frame toward the second surface of the second end portion of the leaf spring member. In this case, the protrusion of the lens frame abuts on the leaf spring member, and an abutting location is a support point of the leaf spring member.

In the lens drive device according to another aspect of the present disclosure, the leaf spring member includes a connection portion interposed between the first end portion and the second end portion, and the second end portion has a uniform width, and the first end portion has a uniform width narrower than the width of the second end portion. In this case, a drivable distance of the lens frame driven in the optical axis direction is extended.

In the lens drive device according to another aspect of the present disclosure, a height position of the first end portion of the leaf spring member in the optical axis direction of the lens is higher than a height position of the second end portion. In this case, the thickness of the lens drive device is reduced.

In the lens drive device according to another aspect of the present disclosure, the actuator includes a piezoelectric element extending along the direction of extension and contraction and including one end and the other end, and a drive shaft joined with the other end of the piezoelectric element and frictionally engaged with the leaf spring member at the outer periphery. The one end of the piezoelectric element is fixed to the base member.

A lens drive device according to an aspect of the present disclosure includes a lower support member, a lens frame positioned on an upper side of the lower support member, a lens is attached to the lens frame, an actuator extending along an optical axis direction of the lens at an outer periphery of the lens frame, and being capable of extending and contracting in the optical axis direction of the lens, a lower end portion of the actuator being fixed to the lower support member, and a leaf spring member extending along the outer periphery of the lens frame, and including a first end portion and second end portion, the first end portion frictionally engaging an outer periphery of an upper end portion of the actuator such that the upper end portion is biased toward the lens frame, and the second end portion attached to the lens frame. The lower support member includes a cutout in a region overlapped with the leaf spring member when viewed from a direction orthogonal to the optical axis.

In the lens drive device, a situation in which the leaf spring member comes in contact with the lower support member does not occur or is less likely to occur by the cutout of the lower support member. Thus, the size of the lower support member can be reduced without hindering the function of the lens drive device, and the lens drive device can be miniaturized.

In the lens drive device according to another aspect of the present disclosure, the leaf spring member includes a connection portion interposed between the first end portion and the second end portion, and the cutout is provided in the lower support member in a region overlapped with the connection portion of the leaf spring member when viewed from the direction orthogonal to the optical axis.

In the lens drive device according to another aspect of the present disclosure, the first end portion and the second end portion of the leaf spring member are overlapped with the lower support member when viewed from the direction orthogonal to the optical axis.

The lens drive device according to another aspect of the present disclosure further includes an upper support member that is overlapped on the upper side of the lower support member. The upper support member includes an upper cutout in a region overlapped with the leaf spring member when viewed from the direction orthogonal to the optical axis.

In the lens drive device according to another aspect of the present disclosure, the actuator includes a piezoelectric element extending along the direction of extension and contraction and including an upper end and a lower end, and a drive shaft joined with the upper end of the piezoelectric element and of which an outer periphery frictionally engages the leaf spring member, and the lower end of the piezoelectric element is fixed to the lower support member.

Advantageous Effects of Invention

According to the present disclosure, there is provided a lens drive device in which driving characteristics are uniform.

BRIEF DESCRIPTION OF DRAWINGS

FIG. 16 is a side view showing a lens drive section of a different aspect.

DESCRIPTION OF EMBODIMENTS

Hereinafter, embodiments of the present disclosure will be described in detail with reference to the accompanying drawings. In the description, the same elements or elements having the same functions will be assigned the same reference signs, and redundant description will be omitted.

First Embodiment

Figure 1:
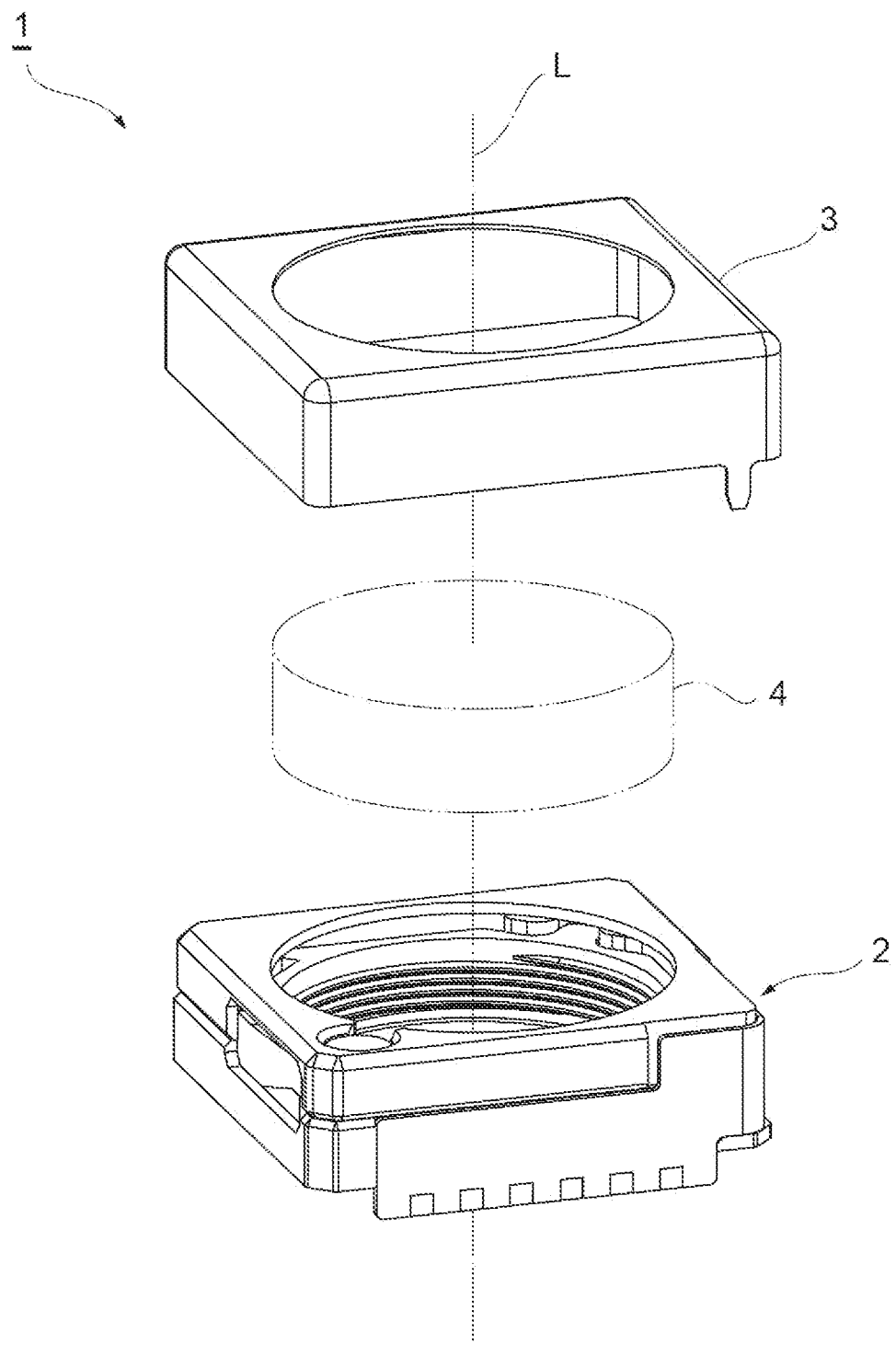
FIG. 1 is an exploded perspective view showing a lens drive device according to a first embodiment.

As shown in FIG. 1, a lens drive device 1 according to a first embodiment includes a lens drive section 2 and a cover 3 that covers the lens drive section 2, and has a lens optical axis L which is an optical axis of a lens 4 to be attached. The lens 4 may be a single lens or a lens barrel including a plurality of lenses.

Figure 2:
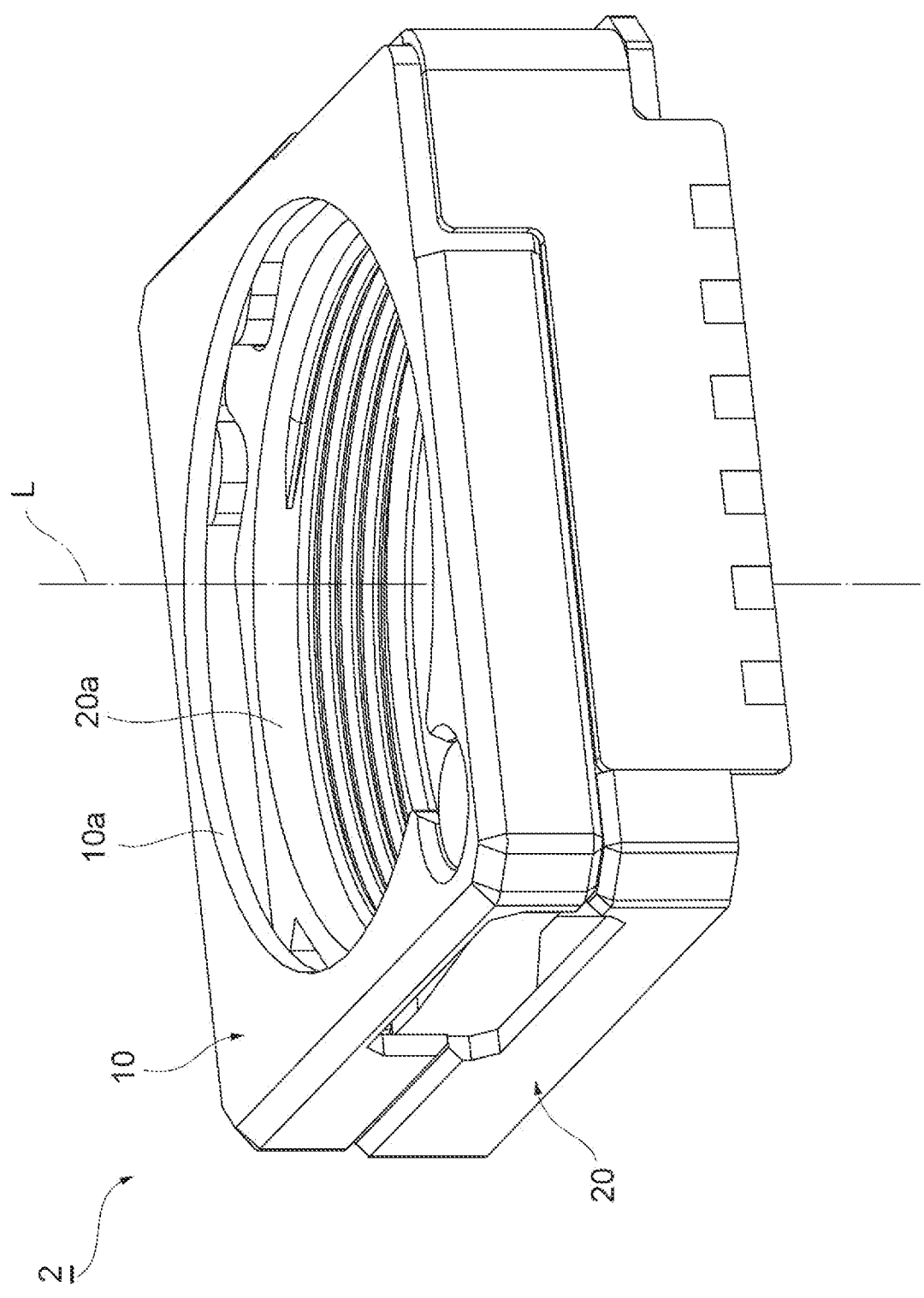
FIG. 2 is a perspective view showing the lens drive section of FIG. 1.

As shown in FIG. 2, the lens drive section 2 has a substantially square columnar outer shape, and includes a cap 10 and a drive body section 20. The cap 10 and the drive body section 20 are overlapped along a direction of the lens optical axis L. Both the cap 10 and the drive body section 20 have through-holes 10a and 20b extending along the direction of the lens optical axis L, respectively. In the present embodiment, the lens 4 is screwed into the drive body section 20 so as to be accommodated in the through-hole 20a of the drive body section 20. For example, a male screw may be formed on an outer peripheral surface of the lens 4, and a female screw may be formed on an inner peripheral surface of the through-hole 20a of the drive body section 20. A diameter of the through-hole 20a of the drive body section 20 is designed to be the same as a diameter of the lens 4, and the through-hole 10a of the cap 10 is also designed to have about the same as the diameter of the lens 4.

Hereinafter, a configuration of the drive body section 20 will be described in more detail with reference to FIGS. 3 to 5.

Figure 3:
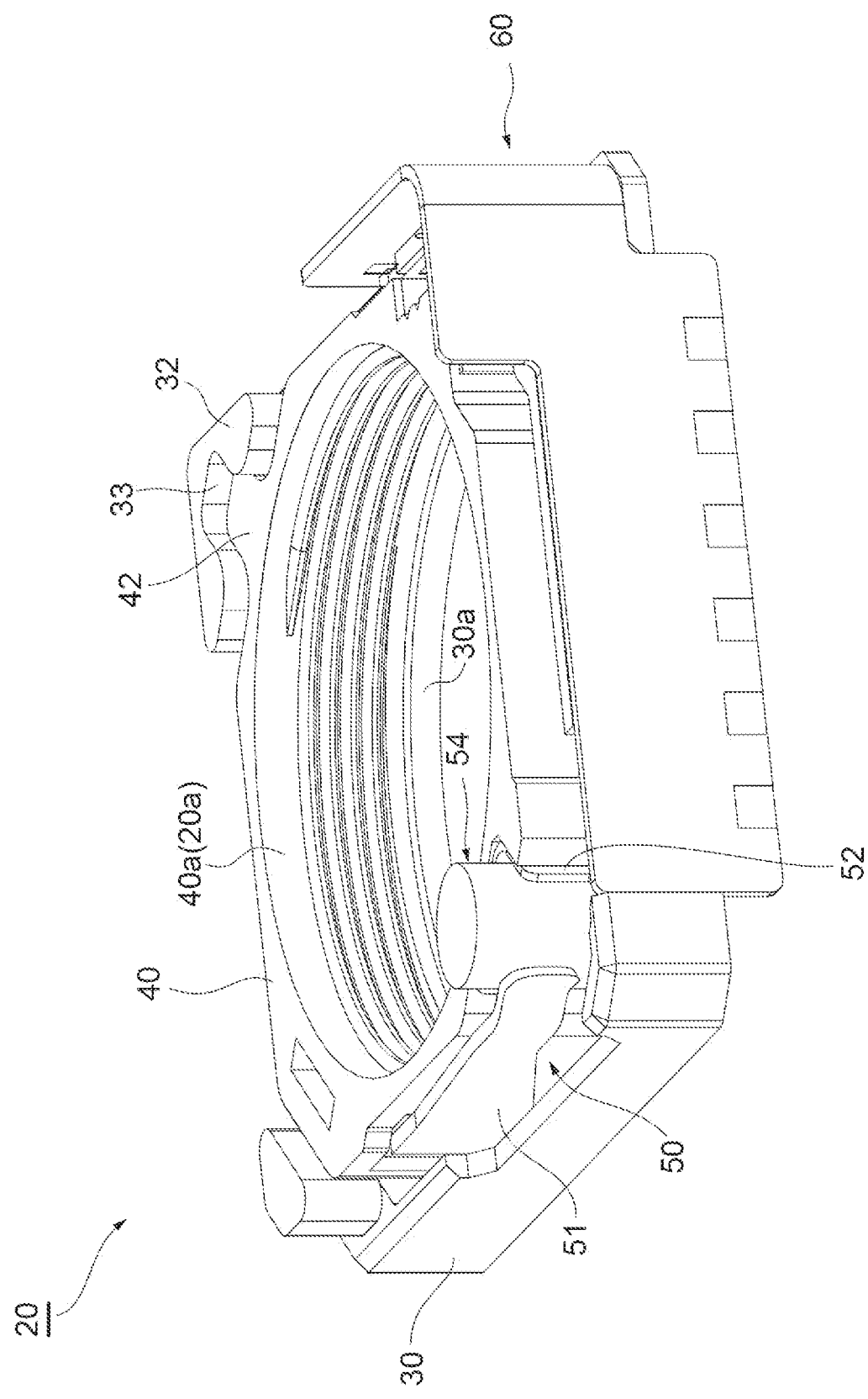
FIG. 3 is a perspective view showing the lens drive section in a state in which a cap is removed.

As shown in FIG. 3, the drive body section 20 includes a base member 30 and a lens frame 40.

The base member 30 extends in a direction orthogonal to the lens optical axis L. As shown in FIG. 4, the base member 30 has a substantially square shape in plan view (that is, when viewed from the direction of the lens optical axis L). An attachment portion 31 to which an actuator 54 to be described later is attached is provided at one corner of the base member 30. In the present embodiment, the attachment portion 31 is a recessed portion that accommodates and fixes a weight portion 57 of the actuator 54. A side wall portion 32 is provided at a corner having a diagonal relation with the corner at which the attachment portion 31 of the base member 30. A cutout 33 for accommodating a protrusion 42 of the lens frame 40 is provided at the side wall portion 32. The base member 30 is made of, for example, a resin material (liquid crystal polymer or the like) containing a filler made of glass, an inorganic material, or the like. The base member 30 can be formed, for example, by injection molding.

Similar to the base member 30, the lens frame 40 extends in the direction orthogonal to the lens optical axis L. The lens frame 40 is disposed so as to be parallel to the base member 30 on an upper side with respect to the lens optical axis L. The lens frame 40 has a through-hole 40a corresponding to the aforementioned through-hole 20a. Similar to the base member 30, the lens frame 40 has a substantially square shape in plan view as shown in FIG. 4. The actuator 54 is attached to an outer periphery of the lens frame 40 at a portion corresponding to the corner at which the attachment portion 31 of the base member 30 is provided by using a friction engagement member 50.

The actuator 54 is a piezoelectric actuator having a Smooth Impact Drive Mechanism. As shown in FIG. 5, the actuator 54 includes a prismatic piezoelectric element 55, a drive shaft 56 joined with a top surface 55a of the piezoelectric element 55, and the weight portion 57 joined with a bottom surface 55b of the piezoelectric element 55. An adhesive such as an epoxy adhesive can be used for joining the piezoelectric element 55 to the drive shaft 56 and the weight portion 57.

The piezoelectric element 55 is made of a piezoelectric material, and inorganic piezoelectric materials such as lead zirconate titanate (so-called PZT), crystal, lithium niobate (LiNbO$_3$), potassium tantalate niobate (K(Ta, Nb)O$_3$), barium titanate (BaTiO$_3$), lithium tantalate (LiTaO$_3$), and strontium titanate (SrTiO$_3$) can be used as the piezoelectric material. The piezoelectric element 55 can have a laminated structure in which a plurality of piezoelectric layers made of the above-mentioned piezoelectric material and a plurality of electrode layers are alternately laminated. A pair of electrodes (not shown) connected to the electrode layers are provided on a side surface of the piezoelectric element 55, and by applying a voltage to the piezoelectric element 55 by the pair of electrodes, adjustment (polarization of piezoelectric ceramics and the like) is performed so as to extend or contract in a direction of an axis (Z-axis in FIG. 5). Thus, the extension and contraction of the piezoelectric element 55 can be controlled by controlling the voltage applied to the pair of electrodes. The piezoelectric element 55 is not limited to the prismatic shape as long as the piezoelectric element has a shape capable of extending and contracting in one direction, and may have a columnar shape or the like.

The drive shaft 56 is made of a composite resin material containing fibers such as carbon fibers. The drive shaft 56 has a columnar shape wider than that of the piezoelectric element 55, and is aligned with the Z-axis of the piezoelectric element 55.

The weight portion 57 is made of a material having a high specific gravity such as tungsten or a tungsten alloy, and is designed to be heavier than the drive shaft 56. The weight portion 57 is set to be heavier than the drive shaft 56, and thus, the weight portion 57 is less likely to be displaced when the piezoelectric element 55 extends and contracts. As a result, the drive shaft 56 can be efficiently displaced. The weight portion 57 has a rectangular flat plate shape and is aligned with the Z-axis of the piezoelectric element 55. In the actuator 54, the weight portion 57 is accommodated and fixed in the attachment portion 31 of the base member 30. At this time, the axis Z of the piezoelectric element 55 of the actuator 54 is designed to be parallel to the lens optical axis L.

The friction engagement member 50 that frictionally engages the actuator 54 includes a leaf spring member 51 and a slider 52.

The leaf spring member 51 is an elastic band-shaped member (for example, a band-shaped member made of stainless steel), and is disposed on the outer periphery of the lens frame 40. The leaf spring member 51 is made of an alloy plate material or a metal plate material, and can be obtained by punching or bending a single plate material. The leaf spring member 51 is constituted by one member, and is configured such that a plurality of members is not joined by, for example, welding or the like. The leaf spring member 51 is configured so as not to be branched when viewed from the direction of the lens optical axis L or a side surface direction.

Figure 5:
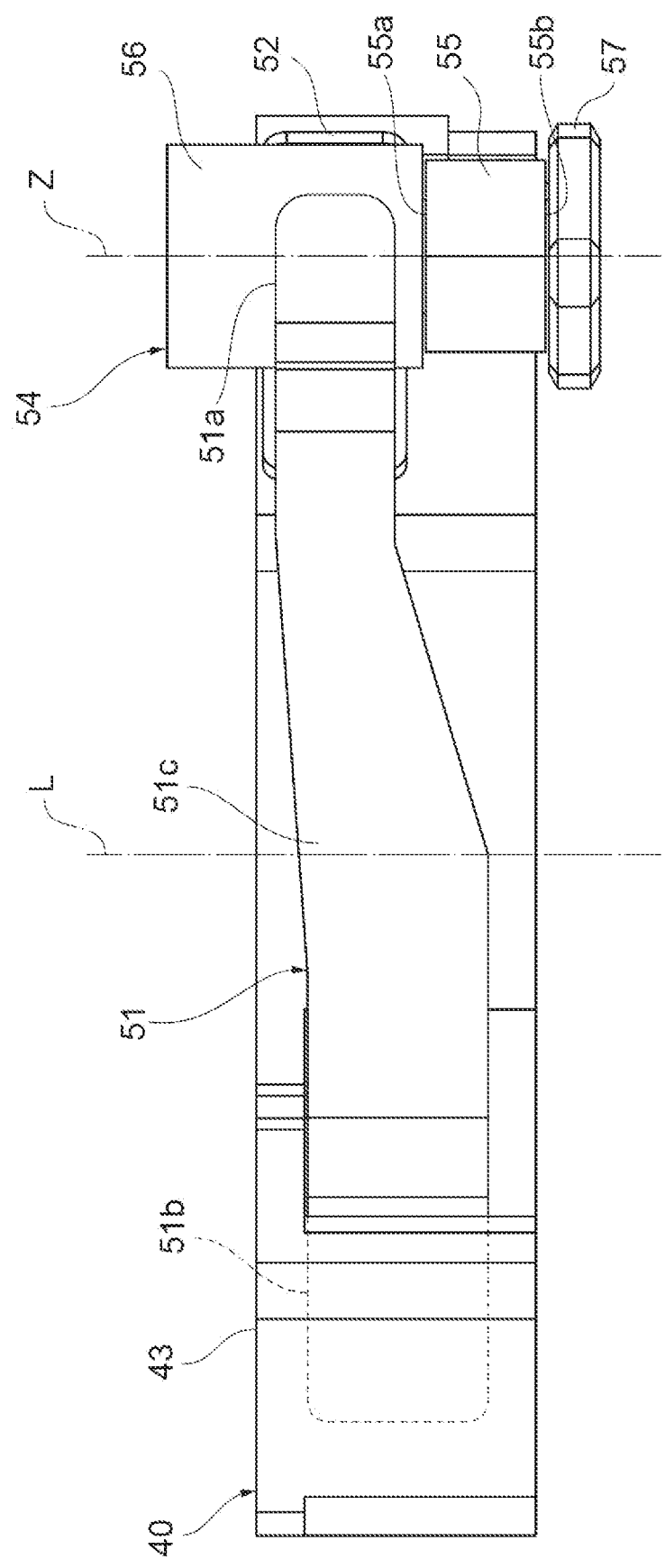
FIG. 5 is a side view showing an actuator and a friction engagement member.
Figure 6:
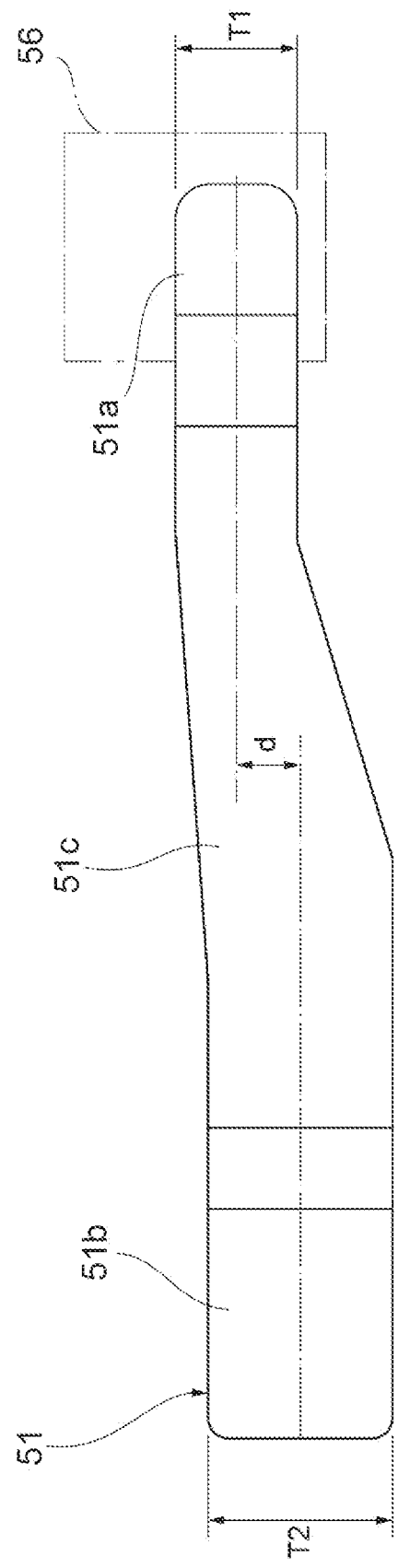
FIG. 6 is a side view showing a leaf spring member of FIG. 5.

As shown in FIGS. 5 and 6, when viewed from the side surface direction, the leaf spring member 51 extends along the outer periphery of the lens frame 40 and is substantially orthogonal to the lens optical axis L. The leaf spring member 51 has a leading end portion 51a (first end portion) and a fixed end portion 51b (second end portion).

The leading end portion 51a is a free end of the leaf spring member 51 and is in contact with the drive shaft 56 of the actuator 54. The leaf spring member 51 biases the drive shaft 56 toward the lens frame 40 at the leading end portion 51a and frictionally engages the actuator 54. At the leading end portion 51a, a location at which the leaf spring member 51 and the drive shaft 56 are in contact with each other is an action point P1 of the leaf spring member 51. The leading end portion 51a extends so as to be orthogonal to the lens optical axis L and the axis Z of the piezoelectric element 55 of the actuator 54, and the leading end portion 51a has a uniform width (that is, a length in the direction of the lens optical axis L) T1.

The fixed end portion 51b is fixed to the lens frame 40. The fixed end portion 51b extends so as to be orthogonal to the optical axis L of the lens and the axis Z of the piezoelectric element 55 of the actuator 54, and the fixed end portion 51b has a uniform width T2. The width T1 of the leading end portion 51a is narrower than the width T2 of the fixed end portion 51b. (T1<T2)

A connection portion 51c is interposed between the leading end portion 51a and the fixed end portion 51b, and the leading end portion 51a and the fixed end portion 51b are connected by the connection portion 51c. A width of the connection portion 51c is not uniform, and the width gradually becomes narrow from the fixed end portion 51b toward the leading end portion 51a. A height position (position with respect to the lens optical axis L) of the leaf spring member 51 is shifted at the connection portion 51c, and a height position of a center line of the leading end portion 51a is higher than a height position of a center line of the fixed end portion 51b by a distance d.

The slider 52 is fixed to a slider fixing portion 41 provided on an outer peripheral surface of the lens frame 40. A right-angled corner is defined by an outer peripheral surface of the slider fixing portion 41, and the slider 52 is a plate-shaped member (for example, a plate-shaped member made of stainless steel) bent at a right angle along the corner.

A portion of the drive shaft 56 of the actuator 54 is sandwiched between the leading end portion 51a of the leaf spring member 51 and the slider 52. At this time, since the leaf spring member 51 biases the actuator 54 toward the slider 52, a predetermined frictional force is generated between the friction engagement member 50 and the actuator 54, and the friction engagement member 50 frictionally engages the drive shaft 56 of the actuator 54. The lens frame 40 to which the friction engagement member 50 is attached also frictionally engages the drive shaft 56 of the actuator 54 via the friction engagement member 50.

In the lens drive device 1, a speed difference between the extension and contraction of the actuator 54 is generated at the time of extending and contracting, and thus, the friction engagement member 50 frictionally engaging the outer periphery of the drive shaft 56 of the actuator 54 is driven together with the lens frame 40 in a direction of extension and contraction (that is, the Z-axis direction) of the actuator 54.

Figure 4:
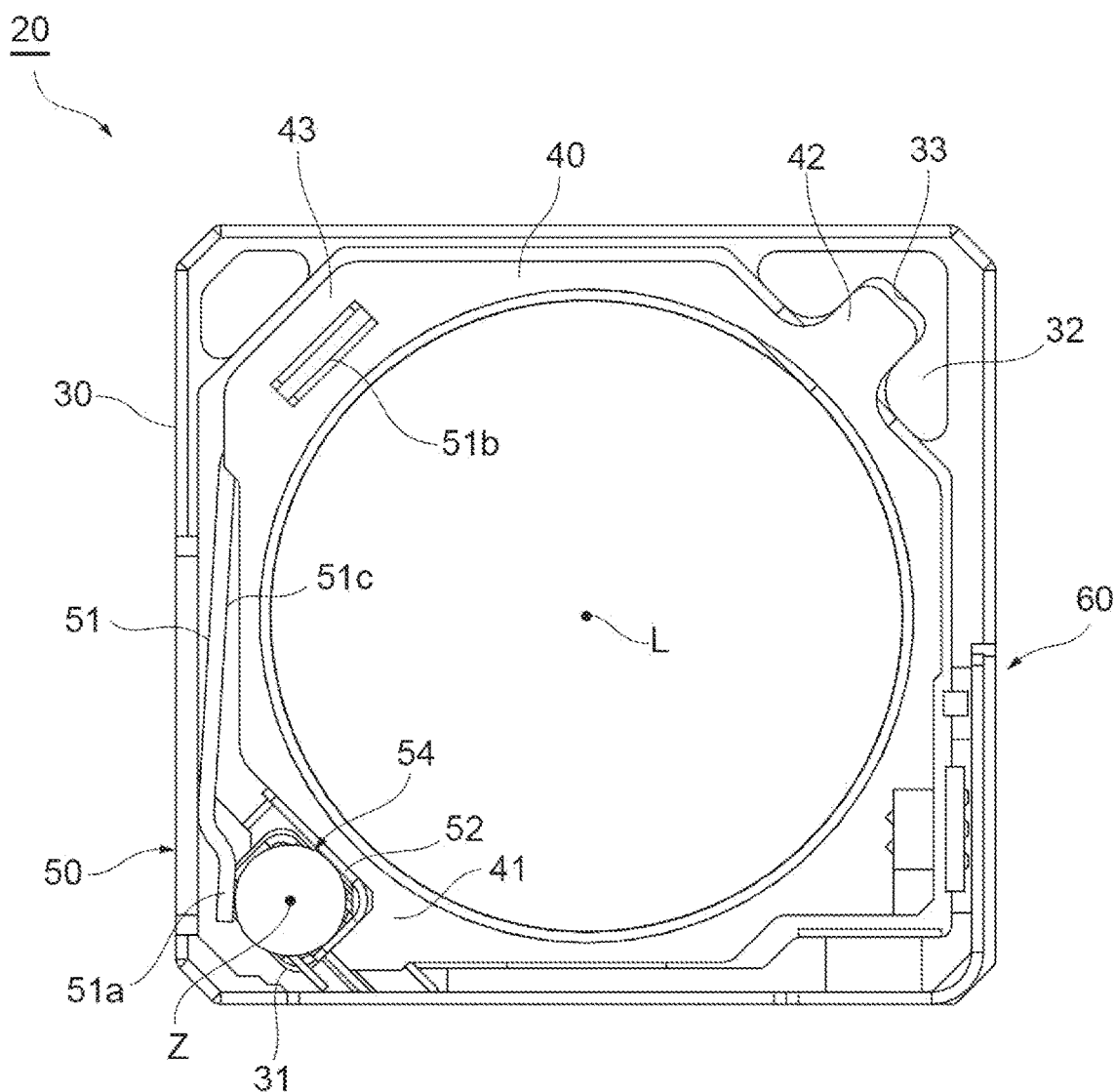
FIG. 4 is a plan view of a lens drive section shown in FIG. 3.

As shown in FIG. 4, a circuit section 60 is provided at the lens drive section 2 in a region corresponding to a corner different from the corner at which the attachment portion 31 of the base member 30 is provided and the corner at which the side wall portion 32 is provided. The circuit section 60 includes a flexible substrate and a position sensor unit. The flexible substrate is provided so as to cover the outer peripheral surface of the lens frame 40 at the corner at which the circuit section 60 is provided. For example, a circuit and a wiring for controlling a voltage applied to the aforementioned actuator 54 are formed on the flexible substrate. A magnetic sensor detects a displacement of the lens frame 40 in the direction of the lens optical axis L by detecting a change in magnetic flux from a magnet provided on the lens frame 40.

Figure 7:
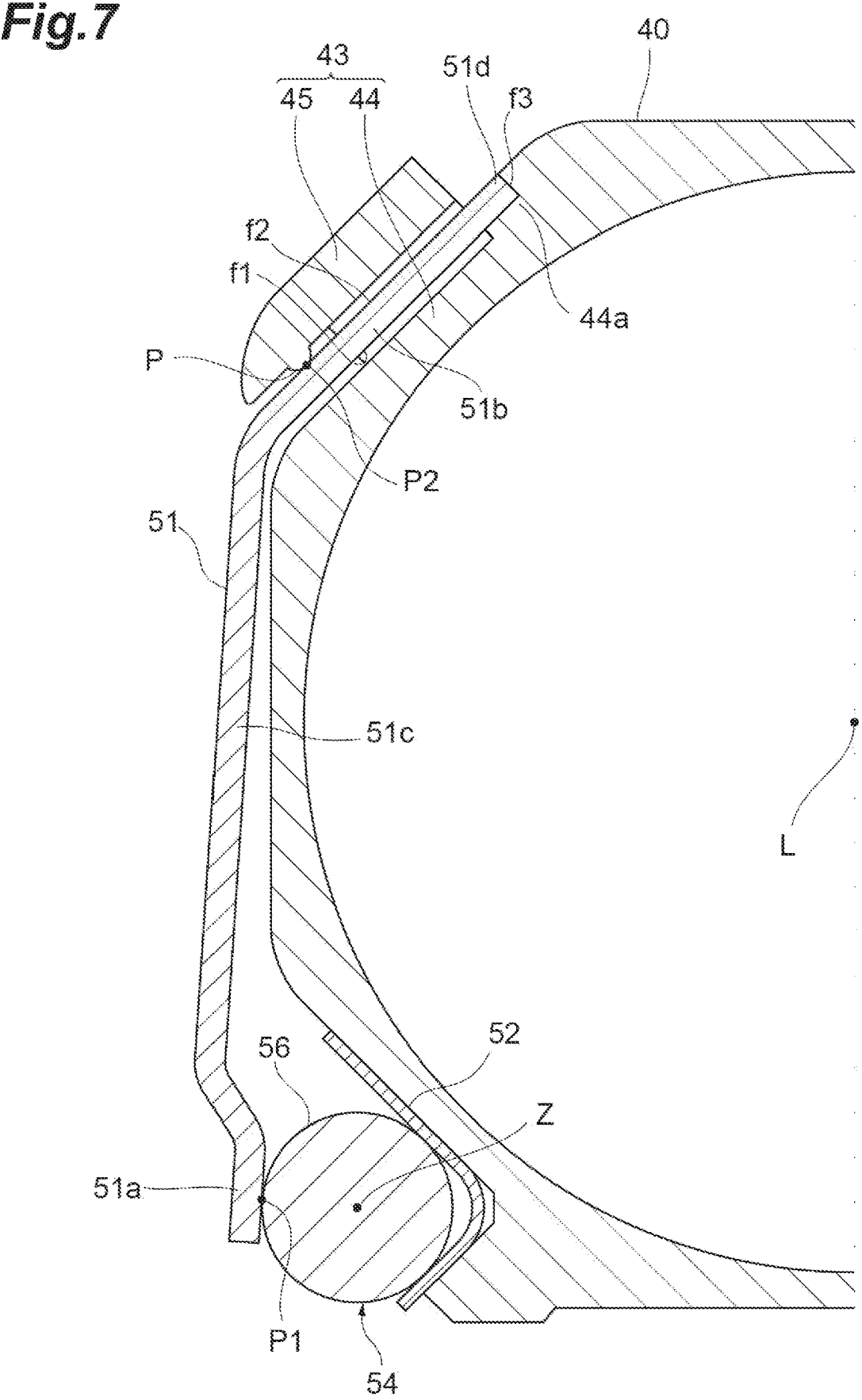
FIG. 7 is an enlarged cross-sectional view of a main part of the lens drive section of FIG. 4.

Hereinafter, a configuration in which the leaf spring member 51 is fixed to the lens frame 40 will be described with reference to FIG. 7.

The lens frame 40 includes an accommodation portion 43 that accommodates the fixed end portion 51b of the leaf spring member 51. Both the fixed end portion 51b and the connection portion 51c have a flat plate shape extending straight when viewed from the direction of the lens optical axis L, and a bent portion is interposed between the fixed end portion 51b and the connection portion 51c. The fixed end portion 51b of the leaf spring member 51 is held and fixed in the accommodation portion 43. The accommodation portion 43 includes a first facing portion 44 facing a first surface f1 of the fixed end portion 51b close to the lens optical axis L, and a second facing portion 45 facing a second surface f2 opposite to the first surface f1.

The first facing portion 44 includes a stepped portion 44a in contact with an end face f3 of the fixed end portion 51b and the second surface f2 near the end face. The fixed end portion 51b is fixed to the accommodation portion 43 of the lens frame 40 at the stepped portion 44a (fixed portion) of the first facing portion 44. The fixed end portion 51b is fixed and aligned with the accommodation portion 43 of the lens frame 40 at the stepped portion 44a of the first facing portion 44.

The second facing portion 45 is integrally formed with the first facing portion 44. The second facing portion 45 includes a protrusion P (support point portion) protruding toward the second surface f2 of the fixed end portion 51b. The protrusion P abuts on the second surface f2 of the fixed end portion 51b. The protrusion P is positioned closer to the leading end portion 51a than the stepped portion 44a.

The fixed end portion 51b of the leaf spring member 51 is gripped on the first surface f1 and the second surface f2 by the stepped portion 44a and the protrusion P of the accommodation portion 43 of the lens frame 40. A location at which the protrusion P and the leaf spring member 51 are in contact with each other at the fixed end portion 51b is a support point P2 of the leaf spring member 51.

In the aforementioned lens drive device 1, the protrusion P is provided at the accommodation portion 43 of the lens frame 40, and a location at which the protrusion P is in contact with the second surface f2 of the fixed end portion 51b is a support point of the leaf spring member 51. The protrusion P can be provided at a position as designed, and a position variation for each product cannot substantially occur. Thus, the support point P2 of the leaf spring member 51 determined by the position of the protrusion P does not vary for each product. Accordingly, a variation in a distance between the support point P2 and the action point P1 of the leaf spring member 51 is suppressed, and a variation in the biasing force of the leaf spring member 51 determined according to the distance between the support point P2 and the action point P1 is also suppressed. As a result, the frictional force of the frictional engagement between the friction engagement member 50 and the actuator 54 is uniform, and driving characteristics of the lens drive device 1 are uniform.

Figure 8:
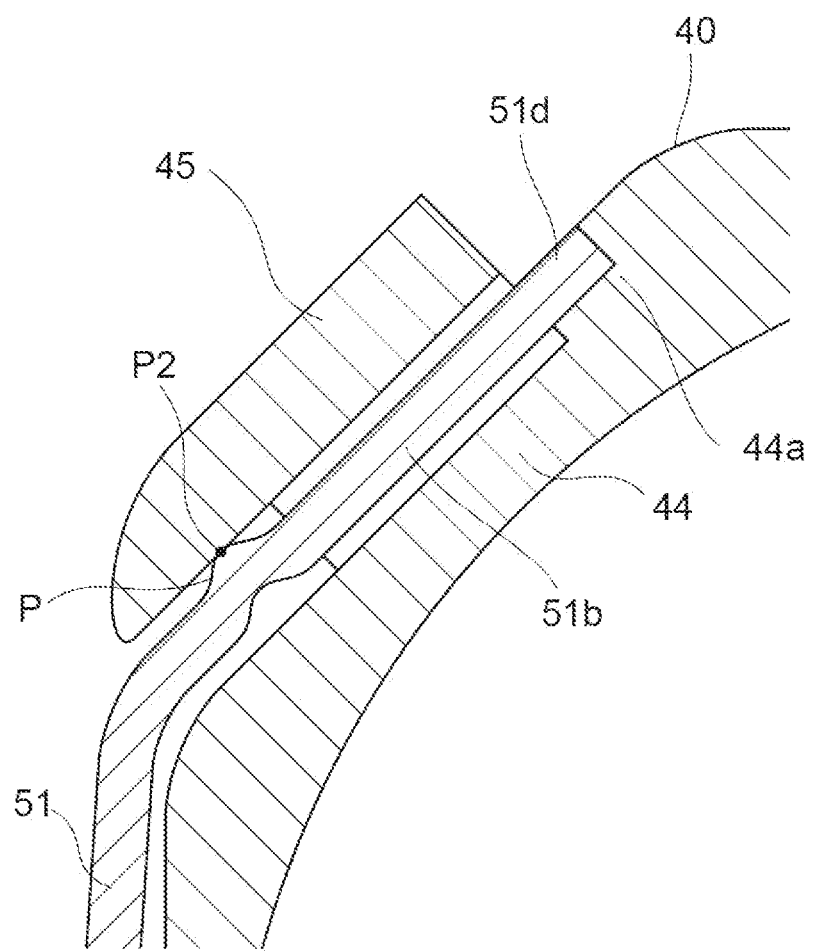
FIG. 8 is a diagram showing a lens drive device of a different aspect.

The protrusion P may be provided not on the lens frame 40 side but on the leaf spring member 51 side as shown in FIG. 8. Even in this case, the protrusion P can be provided at the position as designed, and the position variation for each product cannot substantially occur. Thus, the support point P2 of the leaf spring member 51 determined by the position of the protrusion P does not vary for each product. Accordingly, similar to the aforementioned embodiment, it is possible to realize uniform driving characteristics of the lens drive device 1.

In the lens drive device 1, the protrusion P is provided integrally with the lens frame 40 (or the leaf spring member 51), and thus, a relative position of the protrusion P with respect to the lens frame 40 (or the leaf spring member 51) does not change. As a result, the driving characteristics of the lens drive device 1 are uniform and stable. The protrusion P is integrally provided, and thus, it is possible to facilitate manufacturing, reduce costs, and improve durability.

The lens drive device 1 is designed such that the width T1 of the leading end portion 51a of the leaf spring member 51 is narrower than the width T2 of the fixed end portion 51b. The leading end portion 51a is narrowed in this manner, and thus, a movable range of the leading end portion 51a that moves the drive shaft 56 in the Z-axis direction is widened. As a result, a drivable distance (stroke) of the leaf spring member 51 and the lens frame 40 is extended.

In the lens drive device 1, the height position of the center line of the leading end portion 51a is higher than the height position of the center line of the fixed end portion 51b. Thus, when the leading end portion 51a reaches an upper end of the drive shaft 56, the fixed end portion 51b of the leaf spring member 51 is less likely to protrude upward, and the entire thickness of the lens drive device 1 is reduced. When a height position of an upper end of the fixed end portion 51b is lower than a height position of an upper end of the leading end portion 51a as in the aforementioned embodiment, even when the leading end portion 51a reaches the upper end of the drive shaft 56, the fixed end portion 51b does not protrude above the drive shaft 56, and thus, the thickness of the lens drive device can be further reduced. A separation distance d between the height position of the center line of the leading end portion 51a and the height position of the center line of the fixed end portion 51b is wider than (T2/2-T1), the height of the upper end of the fixed end portion 51b is lower than the height position of the upper end of the leading end portion 51a.

Second Embodiment

Figure 9:
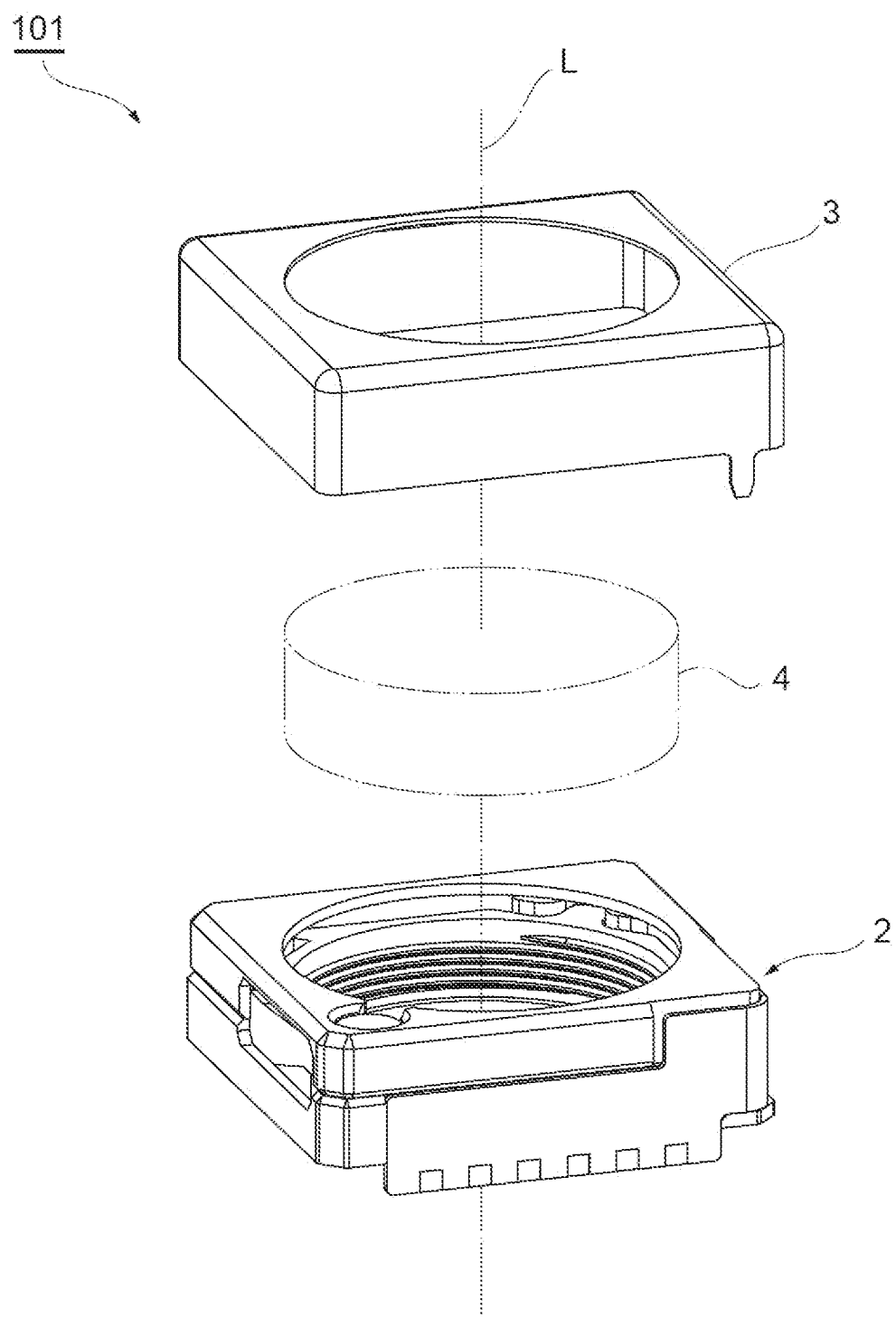
FIG. 9 is an exploded perspective view showing a lens drive device according to a second embodiment.

As shown in FIG. 9, a lens drive device 101 according a second embodiment includes a lens drive section 2 and a cover 3 that covers the lens drive section 2, and has a lens optical axis L which is an optical axis of the lens 4 to be attached. The lens 4 may be a single lens or a lens barrel including a plurality of lenses.

Figure 10:
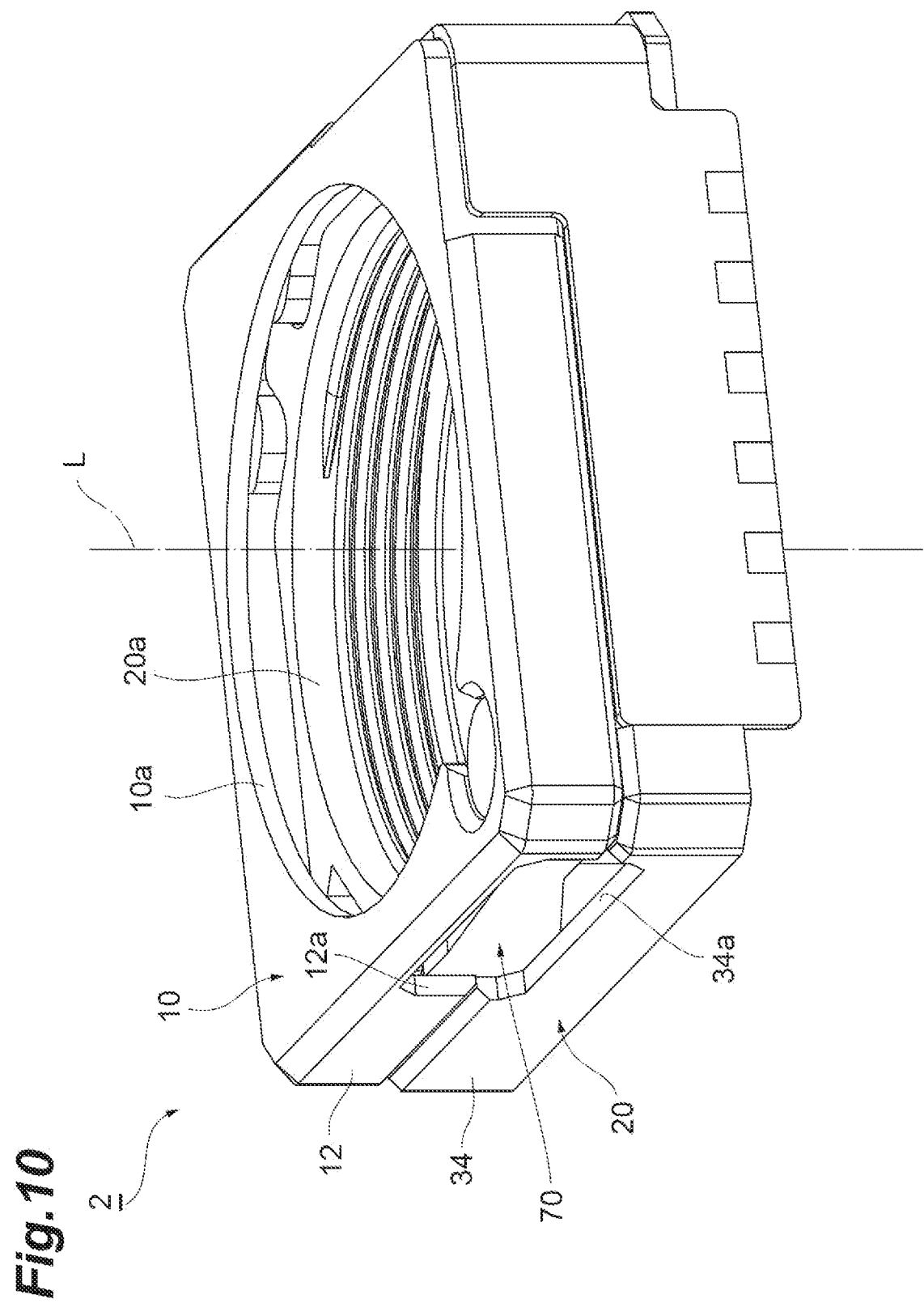
FIG. 10 is a perspective view showing a lens drive section of FIG. 9.

As shown in FIG. 10, the lens drive section 2 has a substantially square columnar outer shape, and includes a cap (upper support member) 10 and a drive body section 20. The cap 10 and the drive body section 20 are overlapped along a direction of the lens optical axis L. Both the cap 10 and the drive body section 20 have through-holes 10a and 20b extending along the direction of the lens optical axis L, respectively. In the present embodiment, the lens 4 is screwed into the drive body section 20 so as to be accommodated in the through-hole 20a of the drive body section 20. For example, a male screw may be formed on an outer peripheral surface of the lens 4, and a female screw may be formed on an inner peripheral surface of the through-hole 20a of the drive body section 20. A diameter of the through-hole 20a of the drive body section 20 is designed to be the same as a diameter of the lens 4, and the through-hole 10a of the cap 10 is also designed to have about the same as the diameter of the lens 4.

Hereinafter, a configuration of the drive body section 20 will be described in more detail with reference to FIGS. 11 to 13.

Figure 11:
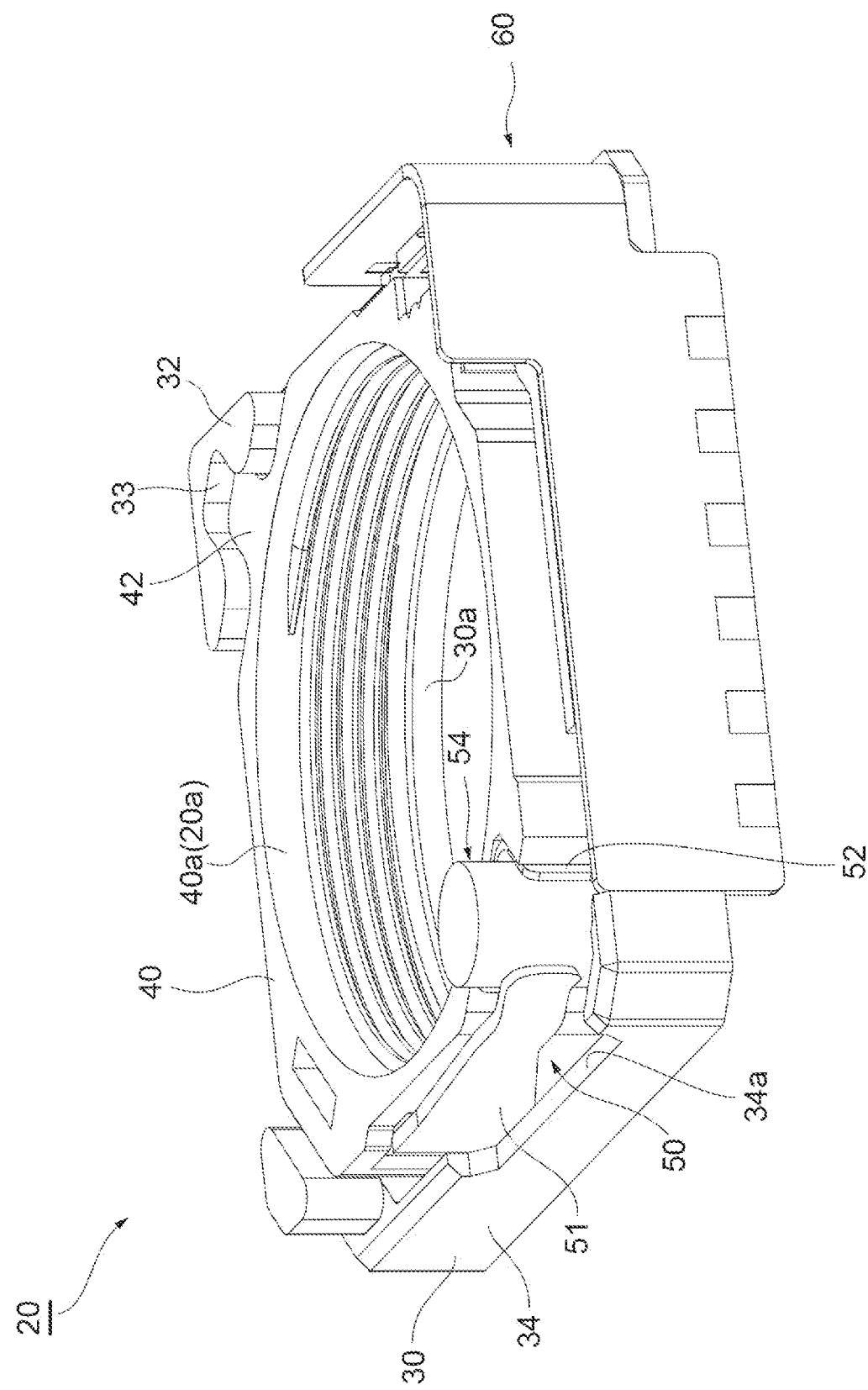
FIG. 11 is a perspective view showing a lens drive section in a state in which a cap is removed.

As shown in FIG. 11, the drive body section 20 includes a base member (lower support member) 30 and a lens frame 40.

The base member 30 extends in a direction orthogonal to the lens optical axis L. As shown in FIG. 12, the base member 30 has a substantially square shape in plan view (that is, when viewed from the direction of the lens optical axis L). An attachment portion 31 to which an actuator 54 to be described later is attached is provided at one corner of the base member 30. In the present embodiment, the attachment portion 31 is an opening portion for accommodating and fixing a weight portion 57 of an actuator 54. A side wall portion 32 is provided at a corner having a diagonal relation with the corner at which the attachment portion 31 of the base member 30. A cutout 33 for accommodating a protrusion 42 of the lens frame 40 is provided at the side wall portion 32. The base member 30 is made of, for example, a resin material (liquid crystal polymer or the like) containing a filler made of glass, an inorganic material, or the like. The base member 30 can be formed, for example, by injection molding.

An outer peripheral wall portion 34 is provided at the base member 30 around the lens frame 40. A height of the outer peripheral wall portion 34 is designed to be, for example, about half a height of the lens frame 40. The outer peripheral wall portion 34 has a cutout 34a to be described later, and surrounds the lens frame 40 other than a portion corresponding to the cutout 34a. In the present embodiment, an outer peripheral wall portion 12 corresponding to the outer peripheral wall portion 34 of the base member 30 is provided at the cap 10 stacked on an upper side of the base member 30. A height of the outer peripheral wall portion 12 is designed to be, for example, about half the height of the lens frame 40. In the present embodiment, a height of the base member 30 and a height of the cap 10 are designed to be substantially the same, and the outer peripheral wall portions 12 and 34 are also designed to be substantially the same. The outer peripheral wall portion 12 of the cap 10 and the outer peripheral wall portion 34 of the base member 30 are in contact with each other and are coupled by an adhesive. A cutout (upper cutout) 12a is provided at the outer peripheral wall portion 12 of the cap 10 in a region corresponding to the outer peripheral wall portion 34 of the base member 30.

Similar to the base member 30, the lens frame 40 extends in the direction orthogonal to the lens optical axis L. The lens frame 40 is disposed so as to be parallel to the base member 30 on an upper side with respect to the lens optical axis L. The lens frame 40 has a through-hole 40a corresponding to the aforementioned through-hole 20a. Similar to the base member 30, the lens frame 40 has a substantially square shape in plan view as shown in FIG. 12. The actuator 54 is attached to an outer periphery of the lens frame 40 at a portion corresponding to the corner at which the attachment portion 31 of the base member 30 is provided by using a friction engagement member 50. The lens frame 40 has an accommodation portion 43 that accommodates a fixed end portion 51b of a leaf spring member 51 to be described later. The fixed end portion 51b of the leaf spring member 51 is held and fixed in the accommodation portion 43, and thus, a support point P2 of the leaf spring member 51 is formed.

The lens frame 40 is accommodated between the cap 10 and the base member 30. The cover 3 shown in FIG. 9 covers the entire lens drive section 2 configured to accommodate the lens frame 40 between the cap 10 and the base member 30 from above. A slight gap is provided between an inner side surface of the cover 3 and outer peripheral surfaces of the cap 10 and the base member 30, and the cover 3 and the base member 30 adhere to each other by an adhesive supplied to the gap.

The actuator 54 is a piezoelectric actuator having a Smooth Impact Drive Mechanism. As shown in FIG. 13, the actuator 54 includes a prismatic piezoelectric element 55, a drive shaft 56 joined with a top surface 55a of the piezoelectric element 55, and the weight portion 57 joined with a bottom surface 55b of the piezoelectric element 55. An adhesive such as an epoxy adhesive can be used for joining the piezoelectric element 55 to the drive shaft 56 and the weight portion 57.

The piezoelectric element 55 is made of a piezoelectric material, and inorganic piezoelectric materials such as lead zirconate titanate (so-called PZT), crystal, lithium niobate ($LiNbO_3$), potassium tantalate niobate ($K(Ta, Nb)O_3$), barium titanate ($BaTiO_3$), lithium tantalate ($LiTaO_3$), and strontium titanate ($SrTiO_3$) can be used as the piezoelectric material. The piezoelectric element 55 can have a laminated structure in which a plurality of piezoelectric layers made of the above-mentioned piezoelectric material and a plurality of electrode layers are alternately laminated. A pair of electrodes (not shown) connected to the electrode layers are provided on a side surface of the piezoelectric element 55, and by applying a voltage to the piezoelectric element 55 by the pair of electrodes, adjustment (polarization of piezoelectric ceramics and the like) is performed so as to extend or contract in a direction of an axis (Z-axis in FIG. 13). Thus, the extension and contraction of the piezoelectric element 55 can be controlled by controlling the voltage applied to the pair of electrodes. The piezoelectric element 55 is not limited to the prismatic shape as long as the piezoelectric element has a shape capable of extending and contracting in one direction, and may have a columnar shape or the like.

The drive shaft 56 is made of a composite resin material containing fibers such as carbon fibers. The drive shaft 56 has a columnar shape wider than that of the piezoelectric element 55, and is aligned with the Z-axis of the piezoelectric element 55.

The weight portion 57 is made of a material having a high specific gravity such as tungsten or a tungsten alloy, and is designed to be heavier than the drive shaft 56. The weight portion 57 is set to be heavier than the drive shaft 56, and thus, the weight portion 57 is less likely to be displaced when the piezoelectric element 55 extends and contracts. As a result, the drive shaft 56 can be efficiently displaced. The weight portion 57 has a rectangular flat plate shape and is aligned with the Z-axis of the piezoelectric element 55. In the actuator 54, the weight portion 57 is accommodated and fixed in the attachment portion 31 of the base member 30. At this time, the axis Z of the piezoelectric element 55 of the actuator 54 is designed to be parallel to the lens optical axis L. The weight portion 57 of the actuator 54 and the attachment portion 31 of the base member 30 can be fixed by adhesion.

The friction engagement member 50 that frictionally engages the actuator 54 includes a leaf spring member 51 and a slider 52.

The leaf spring member 51 is an elastic band-shaped member (for example, a band-shaped member made of stainless steel), and is disposed on the outer periphery of the lens frame 40. The leaf spring member 51 is made of an alloy plate material or a metal plate material, and can be obtained by punching or bending a single plate material. The leaf spring member 51 is constituted by one member, and is configured such that a plurality of members is not joined by, for example, welding or the like. The leaf spring member 51 is configured so as not to be branched when viewed from the direction of the lens optical axis L or a direction orthogonal to the lens optical axis L (that is, side surface direction).

Figure 13:
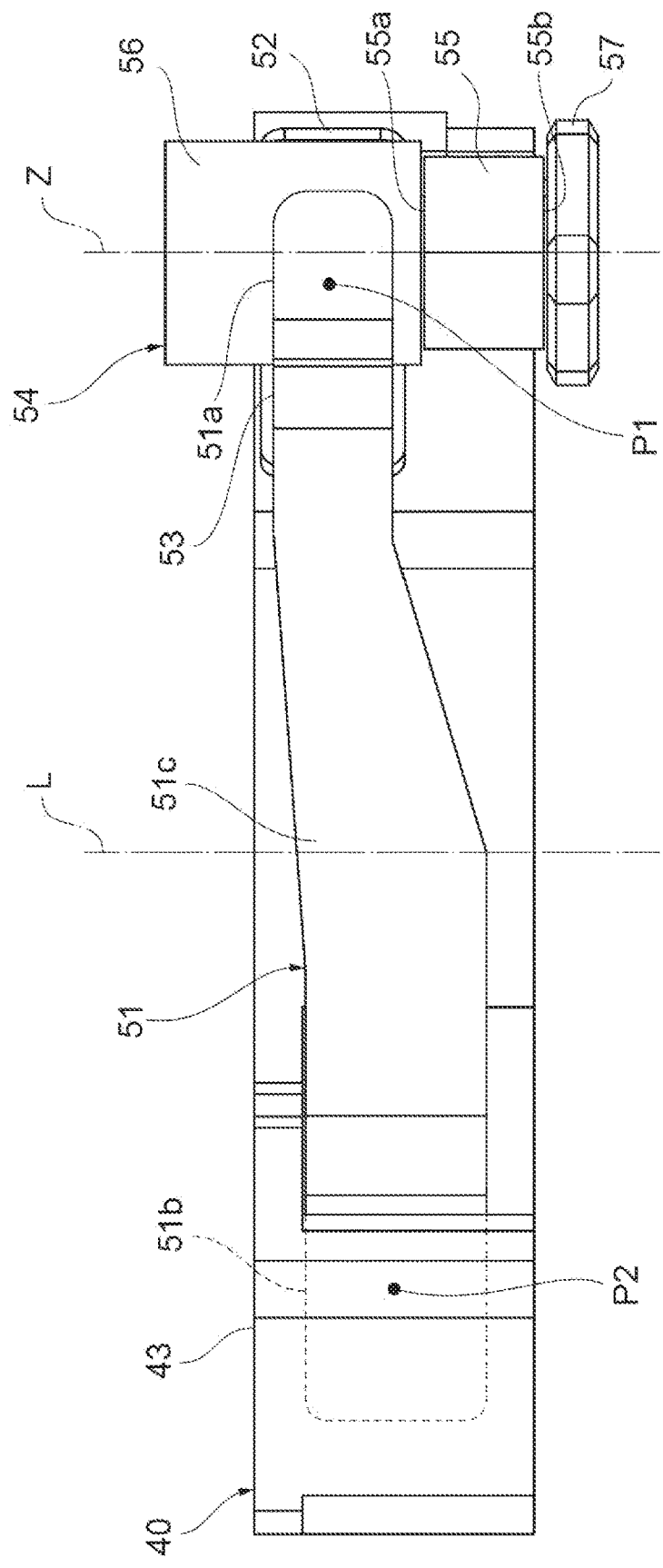
FIG. 13 is a side view showing an actuator and a friction engagement member.

As shown in FIG. 13, when viewed from the side surface direction, the leaf spring member 51 extends along the outer periphery of the lens frame 40 and is substantially orthogonal to the lens optical axis L. The leaf spring member 51 has a leading end portion 51a (first end portion) and a fixed end portion 51b (second end portion).

The leading end portion 51a is a free end of the leaf spring member 51 and is in contact with the drive shaft 56 of the actuator 54. The leaf spring member 51 biases the drive shaft 56 toward the lens frame 40 at the leading end portion 51a and frictionally engages the actuator 54. At the leading end portion 51a, a location at which the leaf spring member 51 and the drive shaft 56 are in contact with each other is an action point P1 of the leaf spring member 51. The leading end portion 51a extends so as to be orthogonal to the lens optical axis L and the axis Z of the piezoelectric element 55 of the actuator 54, and the leading end portion 51a has a uniform width (that is, a length in the direction of the lens optical axis L).

The fixed end portion 51b is fixed to the lens frame 40. The fixed end portion 51b extends so as to be orthogonal to the optical axis L of the lens and the axis Z of the piezoelectric element 55 of the actuator 54, and the fixed end portion 51b has a uniform width. The width of the leading end portion 51a is narrower than the width of the fixed end portion 51b. The leading end portion 51a is narrowed in this manner, and thus, a movable range of the leading end portion 51a that moves the drive shaft 56 in the Z-axis direction is widened. As a result, a drivable distance (stroke) of the leaf spring member 51 and the lens frame 40 is extended.

A connection portion 51c is interposed between the leading end portion 51a and the fixed end portion 51b, and the leading end portion 51a and the fixed end portion 51b are connected by the connection portion 51c. A width of the connection portion 51c is not uniform, and the width gradually becomes narrow from the fixed end portion 51b toward the leading end portion 51a. A height position (position with respect to the lens optical axis L) of the leaf spring member 51 is shifted at the connection portion 51c, and a height position of a center line of the leading end portion 51a is higher than a height position of a center line of the fixed end portion 51b.

Figure 14:
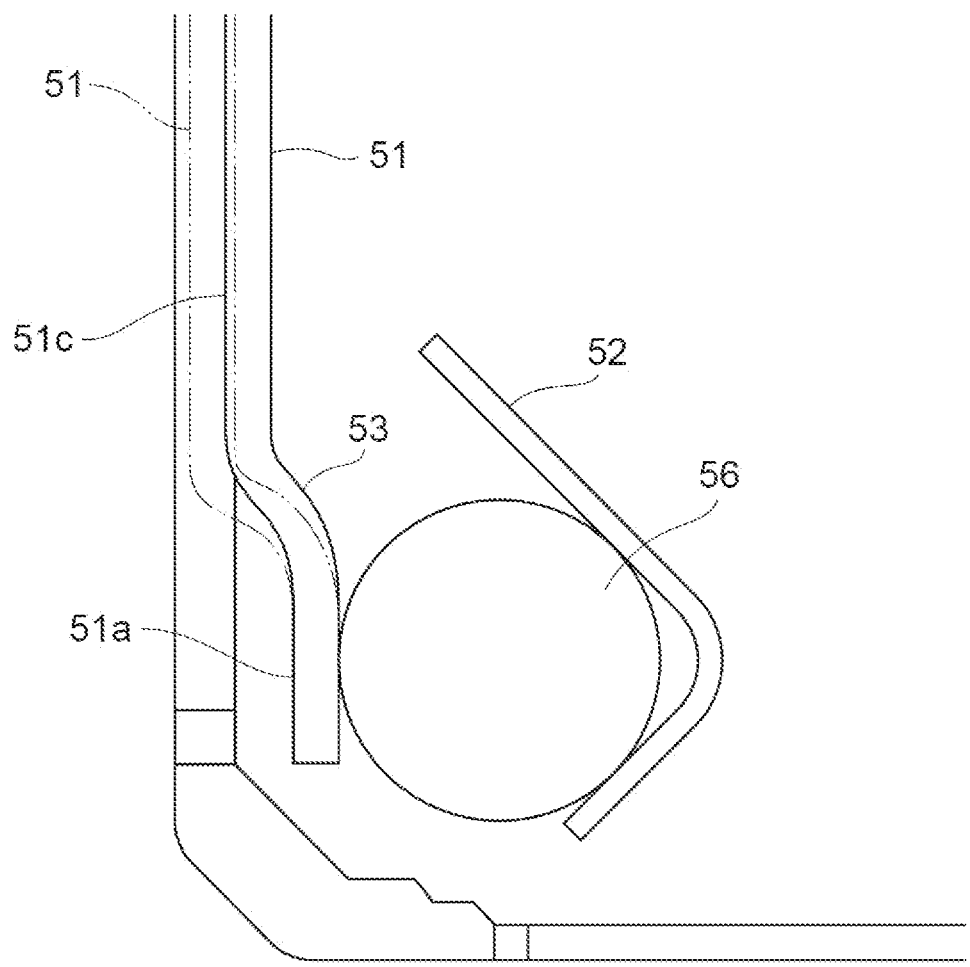
FIG. 14 is a diagram showing a bending amount at a bent portion of a leaf spring member.

A bent portion 53 is formed between the leading end portion 51a and the connection portion 51c. As shown in FIG. 14, the leading end portion 51a is closer to the actuator 54 than the connection portion 51c by the bent portion 53. The bending amount at the bent portion 53 affects a biasing force of the leaf spring member 51, and thus, the bending amount thereof also affects a frictional force of the friction engagement member 50. For example, in the leaf spring member 51 in which the refraction amount at the bent portion 53 is large as indicated by a dashed double-dotted line in FIG. 14, the biasing force of the leaf spring member 51 becomes large, and the frictional force of the friction engagement member 50 becomes large. Thus, the frictional force of the friction engagement member 50 can be adjusted by adjusting the bending amount at the bent portion 53.

The slider 52 is fixed to a slider fixing portion 41 provided on an outer peripheral surface of the lens frame 40. A right-angled corner is defined by an outer peripheral surface of the slider fixing portion 41, and the slider 52 is a plate-shaped member (for example, a plate-shaped member made of stainless steel) bent at a right angle along the corner.

A portion of the drive shaft 56 of the actuator 54 is sandwiched between the leading end portion 51a of the leaf spring member 51 and the slider 52. At this time, since the leaf spring member 51 biases the actuator 54 toward the slider 52, a predetermined frictional force is generated between the friction engagement member 50 and the actuator 54, and the friction engagement member 50 frictionally engages the drive shaft 56 of the actuator 54. The lens frame 40 to which the friction engagement member 50 is attached also frictionally engages the drive shaft 56 of the actuator 54 via the friction engagement member 50.

In the lens drive device 101, a speed difference between the extension and contraction of the actuator 54 is generated at the time of extending and contracting, and thus, the friction engagement member 50 frictionally engaging the outer periphery of the drive shaft 56 of the actuator 54 is driven together with the lens frame 40 in a direction of an extension and contraction (that is, the Z-axis direction) of the actuator 54.

Figure 12:
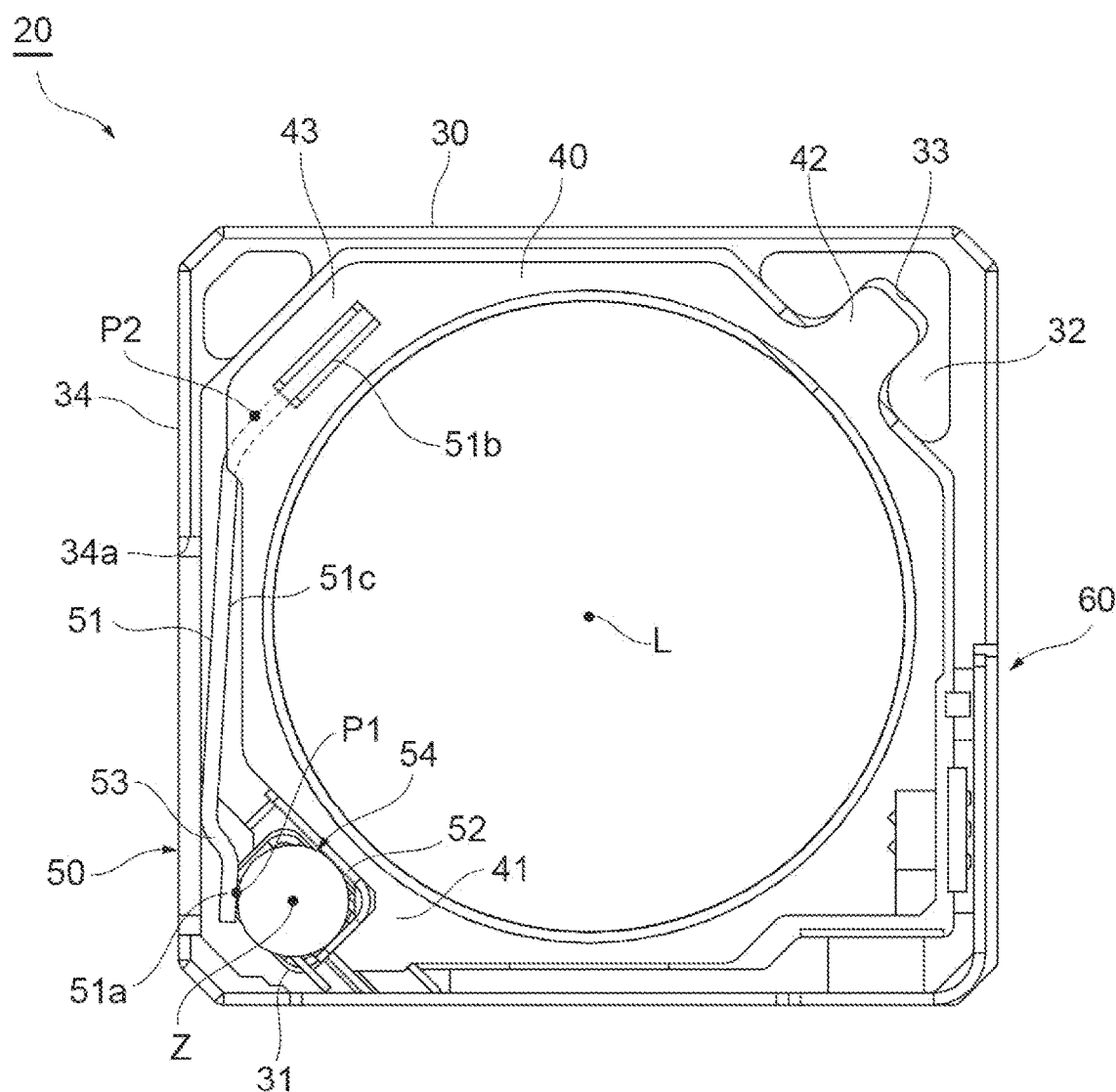
FIG. 12 is a plan view of the lens drive section shown in FIG. 11.

As shown in FIG. 12, a circuit section 60 is provided at the lens drive section 2 in a region corresponding to a corner different from the corner at which the attachment portion 31 of the base member 30 is provided and the corner at which the side wall portion 32 is provided. The circuit section 60 includes a flexible substrate and a position sensor unit. The flexible substrate is provided so as to cover the outer peripheral surface of the lens frame 40 along two sides sandwiching the corner at which the circuit section 60 is provided. For example, a circuit and a wiring for controlling a voltage applied to the aforementioned actuator 54 are formed on the flexible substrate. A magnetic sensor detects a displacement of the lens frame 40 in the direction of the lens optical axis L by detecting a change in magnetic flux from a magnet provided on the lens frame 40.

Here, the cutout 34a of the outer peripheral wall portion 34 of the base member 30 and the cutout 12a of the outer peripheral wall portion 12 of the cap 10 will be described with reference to FIG. 15.

The cutout 34a is formed at the base member 30 at the outer peripheral wall portion 34 extending along a side on which the leaf spring member 51 is located. The cutout 34a extends along the outer peripheral wall portion 34, and an upper end portion of the outer peripheral wall portion 34 is cut out at a substantially uniform height at the cutout 34a.

The cutout 12a is also formed at the cap 10 at the outer peripheral wall portion 12 extending along a side on which the leaf spring member 51 is located. The cutout 12a extends along the outer peripheral wall portion 12, and a lower end portion of the outer peripheral wall portion 12 is cut out at a substantially uniform height at the cutout 12a. In the present embodiment, the cutout 12a of the outer peripheral wall portion 12 of the cap 10 is formed in a region completely corresponding to the cutout 34a of the outer peripheral wall portion 34 of the base member 30.

An escape hole 70 is defined by the cutout 34a of the outer peripheral wall portion 34 of the base member 30 and the cutout 12a of the outer peripheral wall portion 12 of the cap 10.

Figure 15:
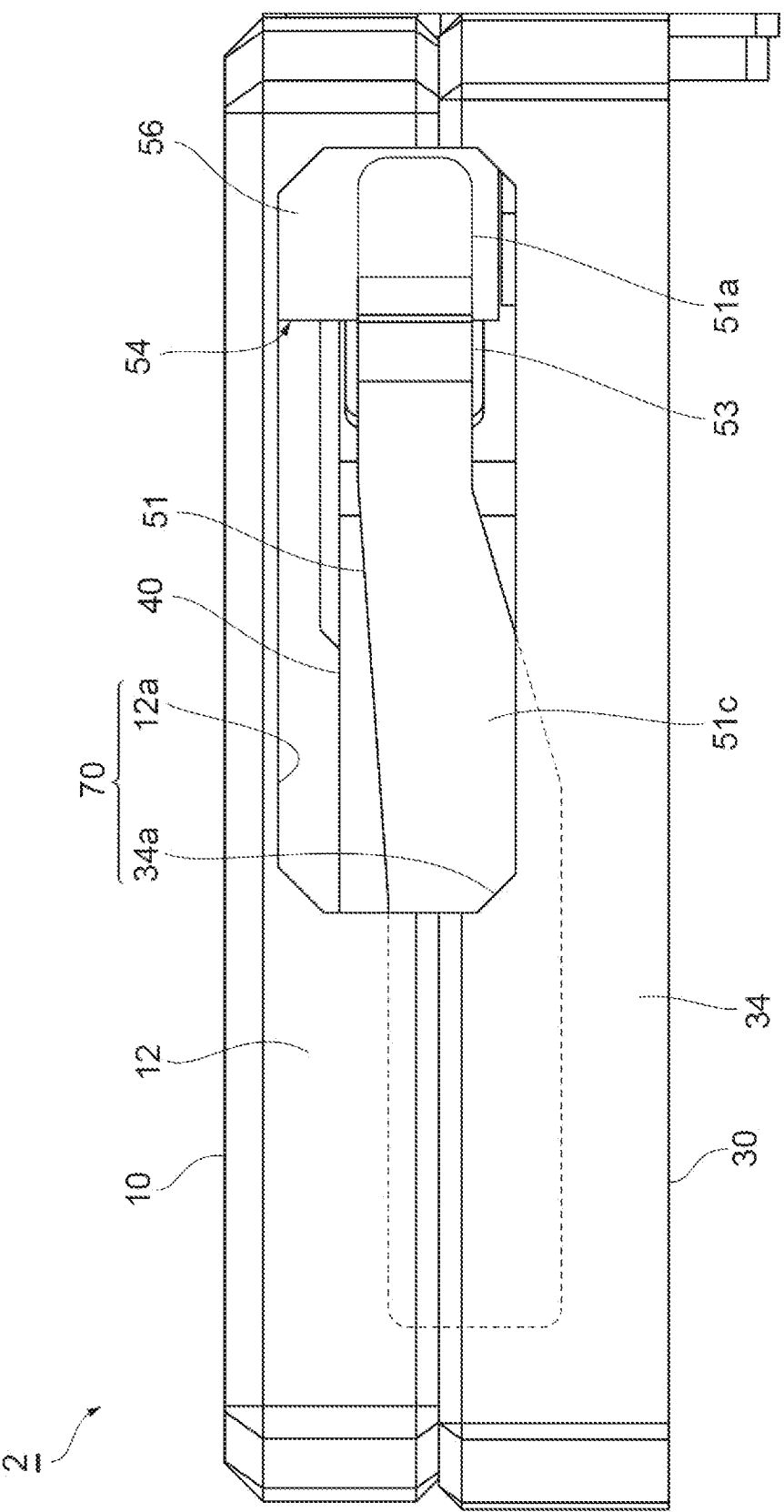
FIG. 15 is a side view showing the lens drive section of FIG. 9.

As shown in a side view of FIG. 15, when viewed from the direction orthogonal to the lens optical axis L, a part of the leading end portion 51a and the connection portion 51c of the leaf spring member 51 is exposed from the escape hole 70. In other words, the leaf spring member 51 is not overlapped with either the outer peripheral wall portion 34 of the base member 30 or the outer peripheral wall portion 12 of the cap 10 when viewed from the direction orthogonal to the lens optical axis L in a region of the escape hole 70.

Thus, when the leaf spring member 51 is elastically deformed in a direction in which the leading end portion 51a is separated from the lens frame 40, a situation in which the leading end portion 51a and the connection portion 51c of the leaf spring member 51 come in contact with the outer peripheral wall portion 34 of the base member 30 and the outer peripheral wall portion 12 of the cap 10 does not occur or is less likely to occur. Accordingly, a situation in which a function of the lens drive device 101 is hindered by bringing the leaf spring member 51 into contact with the base member 30 or the cap 10 is suppressed. For example, when the leaf spring member 51 comes in contact with the base member 30 or the cap 10 or when the leaf spring member 51 rubs against the base member 30 or the cap 10, it is considered that fine powder is generated and the function of the lens drive device is hindered by the fine powder. Alternatively, the leaf spring member 51 comes in contact with the base member 30 or the cap 10, and thus, the elastic deformation of the leaf spring member 51 is hindered. Accordingly, a situation in which desired drive characteristics cannot be realized may occur.

Here, in the lens drive device of Patent Literature 1, the lens drive device can be miniaturized by reducing the size of the housing surrounding the outer periphery of the lens frame. However, in a case where the size of the housing is simply reduced, the leaf spring member comes in contact with the housing when the leaf spring member is elastically deformed, the function of the lens drive device may be hindered.

According to the aforementioned lens drive device 101, the size of the base member 30 can be reduced while avoiding deterioration or degradation of the function, and the miniaturization thereof can be realized. In particular, when the bending amount at the bent portion 53 of the leaf spring member 51 is large as shown in FIG. 14, since the leaf spring member 51 easily comes into contact with the outer peripheral wall portion 34 of the base member 30 and the outer peripheral wall portion 12 of the cap 10, a configuration including the escape hole 70 is effective.

In the present embodiment, since the leaf spring member 51 includes the bent portion 53, the connection portion 51c is a portion closest to the outer peripheral wall portion 34 of the base member 30 and the outer peripheral wall portion 12 of the cap 10. Thus, the escape hole 70 may be provided at least in the region corresponding to the connection portion 51c. That is, as shown in FIG. 16, an aspect in which the leading end portion 51a and the fixed end portion 51b of the leaf spring member 51 are overlapped with the outer peripheral wall portions 12 and 34 when viewed from the direction orthogonal to the lens optical axis L may be illustrated. Even in such an aspect, a situation in which the leaf spring member 51 comes into contact with the outer peripheral wall portion 34 of the base member 30 and the outer peripheral wall portion 12 of the cap 10 is suppressed.

Although the embodiments of the present disclosure have been described above, the present disclosure is not limited to the above-described embodiments, and various modifications can be made. For example, the drive shaft and the weight portion of the piezoelectric actuator can be appropriately omitted, and the piezoelectric actuator may be constituted by only the piezoelectric element. The actuator is not limited to the aforementioned piezoelectric actuator, and may be an electromagnetic drive type actuator including a magnet and a coil, or a drive type actuator using a shape memory alloy. An aspect in which the lens drive device does not include the cap may be illustrated.

REFERENCE SIGNS LIST 1, 101 lens drive device
10 cap
12 outer peripheral wall portion
12a cutout
20 drive body section
30 base member
34 outer peripheral wall portion
34a cutout
40 lens frame
43 accommodation portion
50 friction engagement member
51 leaf spring member
51a leading end portion
51b fixed end portion
51c connection portion
53 bent portion
54 actuator
55 piezoelectric element
56 drive shaft
57 weight portion
70 escape hole
L lens optical axis
P protrusion

The invention claimed is:
1. A lens drive device comprising:
a base member;
a lens frame positioned on an upper side of the base member, a lens is attached to the lens frame;
an actuator extending along an optical axis direction of the lens at an outer periphery of the lens frame, and being capable of extending and contracting in the optical axis direction of the lens, one end portion of the actuator in the optical axis direction being fixed to the base member;
a leaf spring member extending along the outer periphery of the lens frame, and including a first end portion and a second end portion, the first end portion frictionally engaging an outer periphery of the other end portion of the actuator in the optical axis direction such that the other end portion is biased toward the lens frame, and the second end portion gripped by the lens frame on a first surface close to an optical axis of the second end portion and a second surface opposite to the first surface; and
a support point portion positioned closer to the first end portion than a fixed portion, the second end portion of the leaf spring member and the lens frame are fixed at the fixed portion, the second surface of the second end portion and the lens frame contact each other at the support point portion as a support point of the leaf spring member.

2. The lens drive device according to claim 1, wherein the support point portion is a protrusion protruding from the lens frame toward the second surface of the second end portion of the leaf spring member.

3. The lens drive device according to claim 1, wherein
the leaf spring member includes a connection portion interposed between the first end portion and the second end portion, and
the second end portion has a uniform width, and the first end portion has a uniform width narrower than the width of the second end portion.

4. The lens drive device according to claim 3, wherein a height position of the first end portion of the leaf spring member in the optical axis direction of the lens is higher than a height position of the second end portion.

5. The lens drive device according to claim 1, wherein
the actuator includes a piezoelectric element extending along the direction of extension and contraction and including one end and the other end, and a drive shaft joined with the other end of the piezoelectric element and frictionally engaged with the leaf spring member at the outer periphery, and
the one end of the piezoelectric element is fixed to the base member.

\* \* \* \* \*